(12) United States Patent
Ernewein et al.

(10) Patent No.: US 7,571,575 B2
(45) Date of Patent: Aug. 11, 2009

(54) SYSTEM ENABLING AN ASSEMBLY OF AT LEAST ONE GLASS SHEET AND AN OTHER OBJECT, GLASS SHEET PROVIDED WITH ONE SUCH SYSTEM AND USE OF ONE SUCH SHEET

(75) Inventors: Jacques Ernewein, Villecresnes (FR); Philippe Tissot, Sallanches (FR)

(73) Assignee: Saint-Gobain Glass France, Courbevoie (FR)

( * ) Notice: Subject to any disclaimer, the term of this patent is extended or adjusted under 35 U.S.C. 154(b) by 400 days.

(21) Appl. No.: 10/541,738

(22) PCT Filed: Jan. 14, 2004

(86) PCT No.: PCT/FR2004/000053

§ 371 (c)(1),
(2), (4) Date: Mar. 2, 2006

(87) PCT Pub. No.: WO2004/072423

PCT Pub. Date: Aug. 26, 2004

(65) Prior Publication Data

US 2006/0134377 A1 Jun. 22, 2006

(30) Foreign Application Priority Data

Jan. 15, 2003 (FR) .................................. 03 00379

(51) Int. Cl.
*E04H 1/00* (2006.01)
(52) U.S. Cl. .......................... 52/235; 52/204.5; 52/308; 52/204.63

(58) Field of Classification Search ................ 52/204.5, 52/796.1, 235, 306, 307, 308, 204.63, 204.64, 52/474, 476, 477, 478, 479, 480, 482; 428/137; 403/243, 253, 365, 366, 367, 368, 369, 370, 403/371, 221, 408.1
See application file for complete search history.

(56) References Cited

U.S. PATENT DOCUMENTS 4,680,206 A * 7/1987 Yoxon et al. .................. 428/34

(Continued)

FOREIGN PATENT DOCUMENTS

EP 0 801 201 10/1997

(Continued)

*Primary Examiner*—Brian E. Glessner
*Assistant Examiner*—Dinesh Vesra
(74) *Attorney, Agent, or Firm*—Oblon, Spivak, McClelland, Maier & Neustadt, P.C.

(57) ABSTRACT

A system for assembly between a sheet of glass including a countersunk hole on each of its sides and another sheet of glass also including a countersunk hole on each of its sides, each countersunk hole being designed respectively to take first and second connecting pieces, each of the first and second connecting pieces being provided with a bore. The system also includes a connecting core connecting with the first and second connecting pieces. The core includes first and second parts. The first part of the core mates with the surface of the bore of the first connecting piece on which it exerts a force roughly parallel to the axis of the hole and the second part of the core fits into the bore made in the second connecting piece therein to react to the force.

9 Claims, 2 Drawing Sheets

U.S. PATENT DOCUMENTS

| | | | |
|---|---|---|---|
| 5,391,411 A * | 2/1995 | Rowland et al. | 428/34 |
| 5,497,586 A * | 3/1996 | Dodd et al. | 52/172 |
| 5,540,514 A * | 7/1996 | Demars et al. | 403/388 |
| 6,105,319 A * | 8/2000 | Brunt | 52/204.593 |
| 6,131,346 A * | 10/2000 | Kordes | 52/235 |
| 6,138,434 A * | 10/2000 | Demars et al. | 52/786.13 |
| 6,158,177 A * | 12/2000 | Blobaum | 52/208 |
| 6,254,397 B1 * | 7/2001 | Elmer | 439/6 |
| 6,430,894 B1 * | 8/2002 | Chae et al. | 52/786.1 |
| 6,442,911 B2 * | 9/2002 | Elmer et al. | 52/506.01 |
| 6,519,903 B1 * | 2/2003 | Dirisamer et al. | 52/235 |
| 6,623,203 B2 * | 9/2003 | Kreyenborg et al. | 403/374.3 |
| 6,694,687 B2 * | 2/2004 | Elmer | 52/308 |
| 6,796,091 B2 * | 9/2004 | Elmer | 52/235 |
| 6,941,721 B2 * | 9/2005 | Lind | 52/786.13 |
| 2001/0000274 A1 * | 4/2001 | Elmer et al. | 52/235 |
| 2002/0020119 A1 * | 2/2002 | Oberhofer et al. | 52/27 |
| 2002/0050108 A1 * | 5/2002 | Kreyenborg et al. | 52/306 |
| 2002/0178667 A1 * | 12/2002 | Elmer | 52/235 |
| 2003/0154671 A1 * | 8/2003 | Elmer | 52/235 |
| 2008/0005983 A1 * | 1/2008 | Lin | 52/235 |
| 2008/0010921 A1 * | 1/2008 | Lin | 52/235 |
| 2008/0190051 A1 * | 8/2008 | Nugue | 52/204.5 |

FOREIGN PATENT DOCUMENTS

| | | |
|---|---|---|
| EP | 1 170 514 | 1/2002 |
| EP | 1 179 684 | 2/2002 |

* cited by examiner

SYSTEM ENABLING AN ASSEMBLY OF AT LEAST ONE GLASS SHEET AND AN OTHER OBJECT, GLASS SHEET PROVIDED WITH ONE SUCH SYSTEM AND USE OF ONE SUCH SHEET

CROSS-REFERENCE TO RELATED APPLICATION

The present application is the U.S. counterpart of WO 2004/072423, and in turn claims priority of French Application No. 03/00379 filed on Jan. 15, 2003, the entire text of each of which are hereby incorporated herein by reference.

The present invention relates to a system for assembly between at least one sheet of glass, particularly a heat treatment or chemical treatment, comprising at least one countersunk hole and, either another sheet of glass of the same type, or a structural element, particularly one made of metal, and to a sheet of glass equipped with such a system and to the application of such a sheet to the production of a prefabricated entity.

In document EP-A-0 655 543, the Applicant company describes a system for assembly between a glazed element comprising a countersunk hole and a bearing structure, this system comprising a connecting piece connecting between two parts of which one, being frustoconical, mates with the conical surface of the countersunk hole and of which the other, forming a reaction part, bears against the opposite surface of the sheet of glass to the side on which the hole is countersunk. A screw connection between these two parts allows the connecting piece to be clamped in the hole.

This assembly system is well suited to securing a monolithic glazed element to a bearing structure. However, when the monolithic glazed element is toughened, the mounting is not durable and in the event of accidental impact there is a risk that the glazed element will fragment.

In document EP-A-0 801 201, the Applicant company described a system for the assembly of two toughened glass panes. The two panes have countersunk holes facing in opposite directions, in which holes is fitted a connecting piece which secures the assembly after tightening.

This assembly system is particularly well suited to securing heavy glazed elements. However, given the mounting between the connecting piece and the glazed elements (this connecting piece is not fixed to either of the glazed elements) there remains a risk of the entire mounting being destroyed if just one of the glazed elements breaks. In addition, the permissible load is limited.

It is an object of the present invention to provide a solution to this problem of the security of the assembly should one of the glazed elements break.

To obtain this result, the invention provides a system for assembly between a sheet of glass comprising a countersunk hole on each of its sides and another sheet of glass also comprising a countersunk hole on each of its sides, each countersunk hole being designed respectively to take first and second connecting pieces made of two elements making it possible, by clamping said elements, to introduce a preload into the countersunk hole, each of the first and second connecting pieces being provided with a bore, the system comprising a connecting core connecting with the first and second connecting pieces, the particular feature of this system being that the core comprises first and second parts of which the first part mates with the surface of the bore of the first connecting piece on which it exerts a force roughly parallel to the axis of the hole and of which the second part of the connecting core fits into the bore made in the second connecting piece in order therein to react to said force.

The system of the invention makes it possible, when the two parts of which the core is formed are tightened, to establish a play-free mounting within the assembly system.

As a preference, the bore of the first connecting piece is conical and is designed to accommodate the first part of the connecting core.

Furthermore, the conical surface of the first part of the connecting core has a cone angle roughly similar to that of the cone of the bore of the first connecting piece.

In this way, contact between the bore of the first part of the connecting core and the conical part of the first connecting piece lies as close as possible to the straight surface of the sheet of glass assembled with the first connecting piece, and this encourages a flush-fitting of the assembly system.

As a preference, the bore of the second connecting piece is roughly cylindrical and is designed to accommodate the second part of the connecting core.

As a preference, the second part of the connecting core comprises at least a first and a second ring which rings are eccentric and nested one inside the other.

As a further preference, each of the first and second rings is split.

As a preference, the inner bore of the first ring is conical.

Advantageously, the outer bore of the first ring has a step designed to bear on and to be housed in a bore thus securing one of the substrates should the other substrate break.

In this way, when the first and second parts of the connecting core are assembled respectively with the first and second connecting pieces, there remains a gap between the opposing faces of the first and second connecting pieces, this gap corresponding to the thickness of a film of thermoplastic inserted between the two sheets of glass assembled using the assembly system.

The invention is also aimed at at least one sheet of glass at least 6 mm thick, having at least one doubly countersunk hole with a conical part opening onto each side of each of the faces of the sheet of glass and a cylindrical central part which has roughly the same axis as the conical parts, and which has the particular feature that it comprises, inside each countersunk hole, a connecting piece, the connecting pieces being designed to join together so as to allow mounting with the assembly system described hereinabove.

Furthermore, the conical piece or pieces have a cone angle greater than that of the cone of the corresponding countersunk hole.

Advantageously, the connecting piece or pieces and possibly the connecting core are equipped with holding means such as holes, bosses, etc. for transmitting loads directed roughly in the plane of the sheets of glass either to a structural element or to another sheet of glass.

One advantageous application of such sheets is in the production of entities formed of prefabricated elements assembled on site.

The present invention will now be explained in greater detail with the aid of some practical examples illustrated with the drawings which are cross sections through systems according to the invention and which effectively depict:

FIG. 1 shows a system for assembly between two panes 1, 2 of glass. These panes of glass may be toughened, hardened or annealed.

Figure 1:
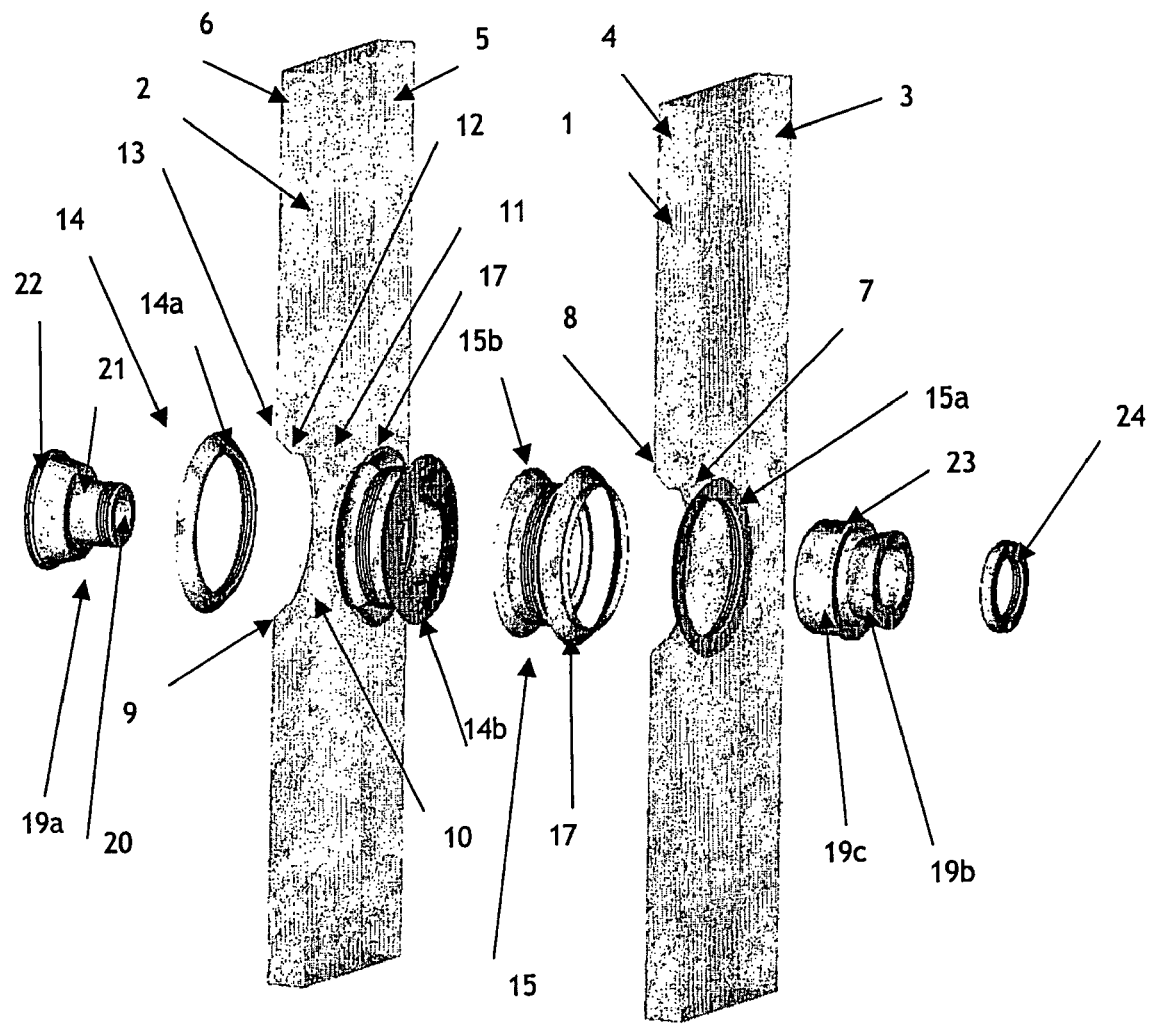
FIG. 1 is a view in section and in elevation of a system for the assembly between two sheets of glass, particularly toughened glass.

Each sheet 1, 2 is pierced on each of its faces 3, 4, 5, 6 with a countersunk hole 7, 8, 9, 10 which comprises a conical part 11, 12 facing in opposite directions. The conical parts 11, 12 facing in opposite directions and belonging to one and the same pane of glass are separated by a cylindrical central part 13 coaxial with said conical parts 11, 12.

The panes or sheets of glass 1, 2 thus pierced are designed respectively to take the first and second connecting pieces 14, 15 made of a metal.

Each of the first and second connecting pieces 14, 15 is made up of two elements 14a, 14b, 15a, 15b, designed to collaborate with one another by clamping at the countersunk holes made in the sheets of glass.

Thus, the first connecting piece 14 comprises a first element 14a which has a conical surface that mates with the shape of one of the conical parts 11, 12 of the hole and a cylindrical part which enters the cylindrical part 13 of the hole without extending as far as the opposite face. This cylindrical part preferably has a diameter smaller than that of the cylindrical part of the hole. The element 14a has, passing through it, a conical bore, the function of which will be explained later on in the text.

The first connecting piece 14 also comprises a second element 14b which has a conical surface that mates with the shape of the other of the conical parts 11, 12 of the hole (in fact, the one facing the opposite direction) and a bore provided with a tapping designed to screw onto a threaded part made on the cylindrical part of the first element 14a.

By screwing the second element 14b onto the first element 14a causing the respective conical surfaces to collaborate at the conical parts 11, 12 of the hole, a play-free assembly is achieved that is able to withstand the forces introduced by the sheet of glass 1 or 2. To improve the contact between the conical bearing surfaces of the first and second elements 14a and 14b and the conical parts 11, 12 of the hole, provision is made for the vertex angles of the cones to differ advantageously by 0.5° to 5°.

In order to improve still further the quality of the assembly between the two elements 14a, 14b of the first connecting piece 14, a ring 17 made of a ductile material (for example aluminum) may be interposed between the conical surfaces of the first and second elements 14a, 14b and the conical parts 11, 12 of the holes.

Likewise, the second connecting piece 15 comprises a first element 15a, which has a conical surface that mates with the shape of one of the conical parts 11, 12 of the hole and a cylindrical part which enters the cylindrical part 13 of the hole without extending as far as the opposite face. This cylindrical part has a diameter smaller than that of the cylindrical part 13 of the hole. The element 15a has passing through it a roughly cylindrical bore 18, the function of which will be explained later on in the text.

The second connecting piece 15 also comprises a second element 15b which has a conical surface that mates with the shape of the other of the conical parts 11, 12 of the hole (in fact the one facing in the opposite direction) and a bore provided with a tapping designed to screw onto a threaded part made on the cylindrical part of the first element 15a.

By screwing the second element 15b onto the first element 15a causing the respective conical surfaces to collaborate at the conical parts 11, 12 of the hole, a play-free assembly is achieved that will be able to withstand the loads introduced by the sheet of glass 1 or 2. In order to improve the contact between the conical bearing surfaces of the first and second elements 15a and 15b of the conical parts 11, 12 of the hole, provision is made for the vertex angles of the cones to differ advantageously by 0.5° to 5°.

In a similar way to the first connecting piece 14 and in order to improve the quality of the assembly between the two elements 15a, 15b of the second connecting piece 15, a ring 17' made of a ductile material (for example aluminum) may be interposed between the conical surfaces of the first and second elements 15a, 15b of the second connecting piece 15 and the conical parts 11, 12 of the holes.

The assembly of the first and second connecting pieces 14, 15 with the respective sheets of glass is a flush fit.

We return now to another element of the assembly system which is intended to collaborate at the first and second connecting pieces 14, 15, namely the connecting core 19.

The connecting core 19 comprises a first piece 19a provided with a central bore 20 intended to accommodate holding means (not depicted in the figures) designed to secure the connecting core 19 and all the parts secured to it to another similar piece or to an exterior bearing structure.

This first piece 19a comprises a roughly cylindrical first region 21 forming a step and a second region 22 with a conical bearing surface.

Overall, the combined thickness dimensions of the first and second regions 21, 22 of the first piece 19a more or less correspond to the thickness of the two sheets of glass 1, 2. It may be pointed out that the conical region 22 is more or less bounded by the first connecting piece 14, while the cylindrical region 21 (the step) is more or less bounded by the second connecting piece 15.

The second region 22 with conical bearing surface is designed to come into contact with the bore, also with a conical bearing surface, made in the first element 14a of the connecting piece 14.

The second region 22 with conical bearing surface belonging to this first piece 19a has a cone angle roughly similar to that of the cone of the bore of the first connecting piece 14.

The first region 21 with conical bearing surface belonging to the first piece 19a of the connecting core 19 collaborates with the other elements 19b, 19c shaping the connecting core 19 and the free end of the first region 21 is threaded.

In the embodiment depicted in FIG. 1, the other elements 19b, 19c of the connecting core 19 consist of at least two rings nesting one inside the other.

Figure 2:
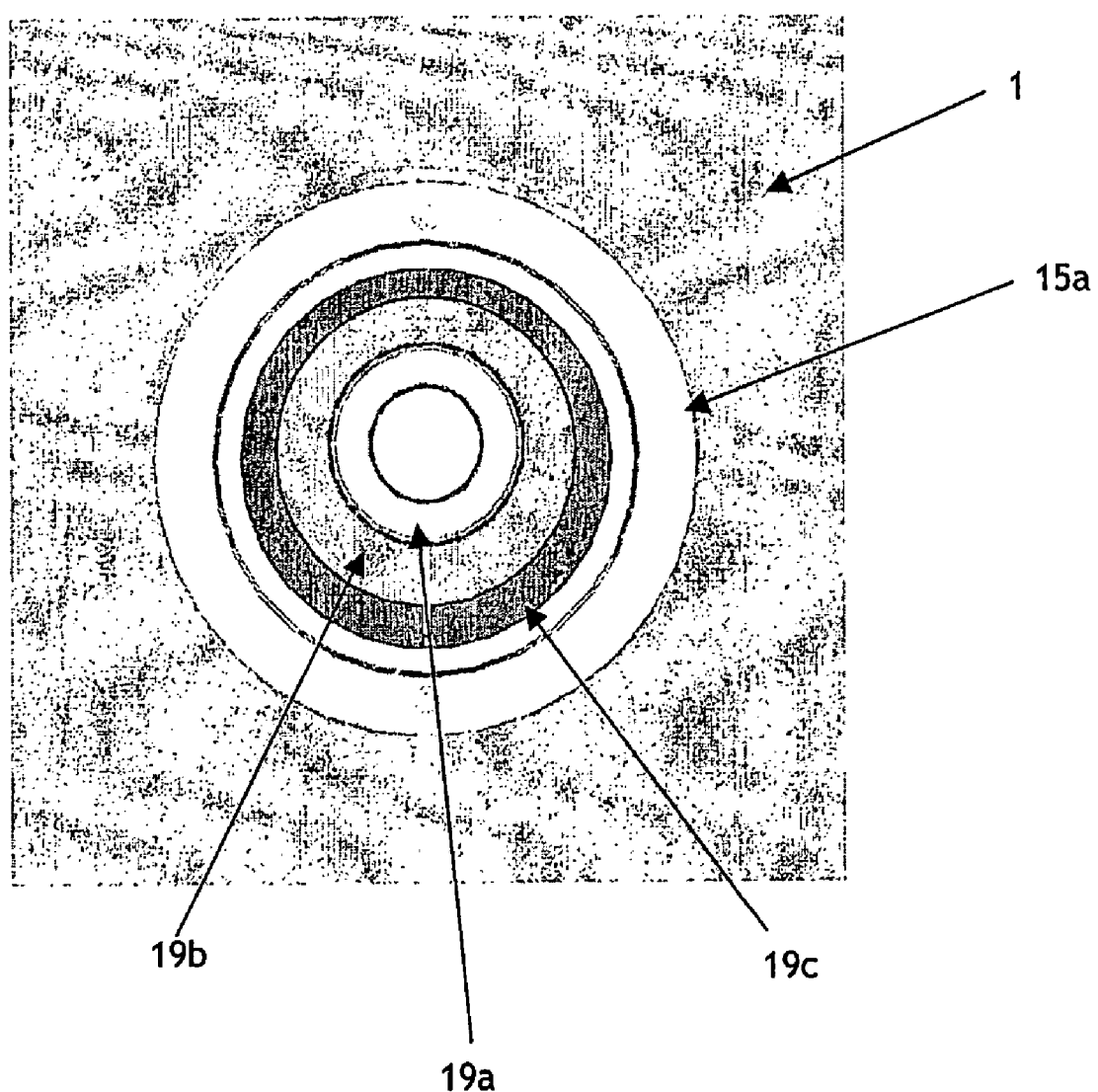
FIG. 2 is a front-on view of the rings belonging to the connecting core.

Each of the rings will now be described. Each of these rings is made of a metal. They are split and are eccentric (as can be seen in FIG. 2).

The ring known as the <<inner ring>> has a bore of substantially cylindrical wall which fits with minimum clearance into the step 21 of the first piece 19a constituting the connecting core 19 and an external wall with a conical bearing surface designed to collaborate, also with minimal clearance, with a bore made in the ring known as the <<outer ring>> 19c.

This <<outer ring>> 19c collaborates by nesting with the bore or roughly cylindrical bearing surface made in the second element 15b of the second connecting piece 15.

It will be noted that the outer bore of the <<outer ring>>19c has a step 23 designed to be housed in a bore thus holding the glass 1 should the glass 2 break.

The string of dimensions of the stack of elements that form the connecting core 19 is calculated such that the element 19a is nested inside the first connecting piece 14 and when the rings 19b and 19c secured to the second connecting piece 15 collaborate with the cylindrical part of 19*a*, there is still a gap between the opposing faces of the two glazed elements 1, 2.

This gap is intended to be filled with a sheet of thermoplastic made, for example, of PVB or PU, this sheet of thermoplastic constituting the laminating interlayer between the two glazed elements 1, 2.

The advantage with this mounting lies in the fact that this laminating interlayer is not subjected to compressive forces when force is applied to the glazed elements; it cannot be compressed during mounting.

The clamping of the assembly system is provided by a nut 24 which screws onto the threaded end of the cylindrical region 21 of the first piece 19*a* of the connecting core 19.

Another particular feature of the rings 19*b*, 19*c* that together with the piece 19*a* make up the connecting core 19 lies in the fact that the axes of rotation are eccentric.

When two sheets of glass 1, 2 are being assembled and, given the manufacturing tolerances on the positioning of the holes 7, 8, 9, 10, there may remain a lack of alignment between the holes 7, 8 on the one hand, and the holes 9, 10 on the other, which needs to be compensated for.

By turning the rings 19*b*, 19*c* one with respect to the other about the cylindrical part 21 of the piece 19*a* it is possible to compensate for mounting clearances.

This rotational movement of the rings 19*b*, 19*c* relative to each other, combined with their structural peculiarities (they are split and have conical bearing surfaces) guarantees the user, at the time of final assembly, a play-free mounting which is able to withstand very high loads. By way of example, for an assembly of a laminated glass 19 mm thick in the case of each of the glass panels, a load of 20 tonnes applied as a tensile force was unable to cause the assembly to yield.

Furthermore, by way of major advantages of the proposed solution, the aforementioned assembly is able to meet very strict safety requirements. It may be pointed out that each of the glass sheets is secured by its respective connecting piece 14 and 15 to the connecting core 19. The use of a laminating interlayer between the two sheets of glass guarantees that should one of the sheets of glass break, the entity will retain its cohesion and remain secured to the connecting core, which is fixed either to a bearing structure or to another element of the same type.

It will be noted that, for esthetic reasons, the dimensions of the pieces and of the holes have been designed such that the pieces 19, 14, 15 lie exactly flush with the surfaces 3, 6 of the panes of glass 1, 2 once the device has been tightened.

Of course, the invention applies not only to glass but to all fragile materials.

The invention claimed is:

1. A system for assembly between a first sheet of glass including a first hole with countersunk surfaces on each of its sides and a second sheet of glass including a second hole with countersunk surfaces on each of its sides, comprising:
    a first connecting piece in said first hole, said first connecting piece being made of two elements and having a bore and further having conical surfaces that mate with the countersunk surfaces of the first hole;
    a second connecting piece in said second hole, said second connecting piece being made of two elements and having a bore and further having conical surfaces that mate with the countersunk surfaces of the second hole;
    a connecting core connecting with the first and second connecting pieces, wherein the connecting core comprises first and second parts, wherein the first part mates with the surface of the bore of the first connecting piece on which it exerts a force roughly parallel to an axis of the hole and the second part fits into the bore made in the second connecting piece therein to react to the force.

2. The assembly system as claimed in claim 1, wherein the bore of the first connecting piece is conical and is configured to accommodate the first part of the connecting core.

3. The assembly system as claimed in claim 1, wherein the conical surface of the first part of the connecting core has a cone angle roughly similar to that of the cone of the bore of the first connecting piece.

4. The assembly system as claimed in claim 1, wherein the bore of the second connecting piece is roughly cylindrical and is configured to accommodate the second part of the connecting core.

5. The assembly system as claimed in claim 1, wherein the second part of the connecting core comprises at least a first and a second ring that are eccentric and nested one inside the other.

6. The assembly system as claimed in claim 5, wherein each of the first and second rings is split.

7. The assembly system as claimed in claim 5, wherein an inner bore of the first ring is conical.

8. The assembly system as claimed in claim 5, wherein an outer bore of the first ring has a step configured to be housed in a bore thus retaining the glass should the glass break.

9. The assembly system as claimed in claim 1, wherein at least one of the connecting pieces or the connecting core are configured to accommodate holding means for transmitting loads directed roughly in the plane of the sheets of glass either to a structural element or to another sheet of glass.

\* \* \* \* \*